(12) United States Patent
Shindo et al.

(10) Patent No.: US 7,872,836 B2
(45) Date of Patent: Jan. 18, 2011

(54) DISK DRIVE DEVICE

(75) Inventors: Hitoshi Shindo, San Jose, CA (US); Teruhiro Nakamiya, Kanagawa (JP); Kouki Uefume, Kanagawa (JP); Takako Hayakawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 565 days.

(21) Appl. No.: 12/008,275

(22) Filed: Jan. 9, 2008

(65) Prior Publication Data

US 2008/0165449 A1 Jul. 10, 2008

(30) Foreign Application Priority Data

Jan. 9, 2007 (JP) ................ 2007-001819

(51) Int. Cl.
*G11B 33/14* (2006.01)
(52) U.S. Cl. ................................ 360/319
(58) Field of Classification Search ........... 360/97.01, 360/97.02, 97.03, 97.04
See application file for complete search history.

(56) References Cited

U.S. PATENT DOCUMENTS 7,062,387 B1 * 6/2006 Burns et al. .............. 702/51
7,773,338 B2 * 8/2010 Hayakawa et al. ........ 360/97.02
2005/0068666 A1 3/2005 Albrecht et al.
2008/0007866 A1 * 1/2008 Hayakawa et al. ........ 360/97.02
2008/0310048 A1 * 12/2008 Hirono et al. ............. 360/97.02

FOREIGN PATENT DOCUMENTS

JP 2003-133337 A 5/2003

* cited by examiner

*Primary Examiner*—Allen T Cao

(57) ABSTRACT

In a disk drive device in which low-density gas is sealed, embodiments of the present invention help to improve joint reliability at a solder joint section between a feedthrough and an enclosure with respect to stress applied by deformation due to changes in temperature environment in use. According to one embodiment, helium gas is sealed in an interior space of an HDD. A feedthrough is solder jointed to a feedthrough mounting surface of a base. At a part with relatively large thermal stress, a width of the feedthrough mounting surface is increased, and at a part with relatively small thermal stress, a width of the feedthrough mounting surface is decreased. This prevents a crack penetrating path from being generated at the solder joint section due to the thermal stress and prevents the solder joint section from contacting pins.

6 Claims, 9 Drawing Sheets

DISK DRIVE DEVICE

CROSS-REFERENCE TO RELATED APPLICATION

The instant nonprovisional patent application claims priority to Japanese Patent Application No. 2007-001819 filed Jan. 9, 2007 and which is incorporated by reference in its entirety herein for all purposes.

BACKGROUND OF THE INVENTION

Currently, hard disk drives (hereinbelow, referred to as HDDs) rotate magnetic disks and drive head gimbal assemblies (hereinbelow, referred to as HGAs) at high speed in response to requests for huge capacity, high recording density, and high-speed accessing. These cause fluctuation of air (turbulence) to buffet the magnetic disks and HGAs. This turbulence buffeting can be a big disturbance for positioning heads for data which are recorded with high-density on a magnetic disk. This is because the turbulence occurs at random and it is difficult to estimate its magnitude and cycle so that swift and accurate positioning control will be complex and difficult. Also the turbulence buffeting may cause a noise to impair the quietness of the device.

Another problem caused by influence of the air within the device due to the high-speed rotation other than the foregoing is increase of electric power consumption. When the magnetic disk is rotated at high-speed, the air around the disk is dragged and rotated together. On the other hand, the air apart from the magnetic disk remains still so that shearing force arises therebetween to become a load against the rotation of the disk. This is called a windage loss, which becomes larger as the disk rotates at higher speed. In order to rotate the disk at high-speed against the windage loss, a motor will require a larger output and electric power.

Focusing on that the above-described turbulence and windage loss are proportional to the density of the gas within the device, there is an idea to reduce the turbulence and windage loss by enclosing low-density gas instead of air in a hermetically-sealed HDD. Hydrogen, helium, or the like is exemplified as the low-density gas, but helium is optimum because it is effective, stable, and safe in considering actual use. HDDs with sealed helium gas can solve the above-described problems and realize swift and accurate positioning control, electric power saving, and satisfactory quietness.

However, molecules of helium are so small and a diffusion coefficient of helium is large. Therefore, there has been a problem that enclosures used for usual HDDs are poorly sealed so that helium gas leaks easily during normal use. In order to make it possible to hermetically seal low-density gas such as helium gas, for example, a technique disclosed in the Japanese Patent Publication No. 2005-0068666 ("Patent Document 1") described below has been suggested.

This Patent Document 1 discloses a magnetic disk device in which a feedthrough for coupling an FPC assembly inside the enclosure to a circuit board outside the enclosure is attached to an opening of the base and the enclosure is hermetically-sealed with a cover. With respect to the joint section of the base and the cover through which the helium inside the enclosure is likely to be leaked, the aluminum die-casted base and the aluminum cover are laser-welded so as to securely seal the joint section. With respect to the attaching section of the feedthrough through which the helium inside the enclosure is likely to be leaked, the feedthrough is constituted by a flange and a plurality of pins fixed to the flange with a sealing material such as glass or the like, and the flange is soldered to the rim of the opening on the bottom surface of the base so as to securely seal the attaching section.

As described above, the pins of the feedthrough are fixed to the flange with the sealing material. As the sealing material, glass is frequently used. The thermal expansion coefficient of the glass is significantly different from the one of aluminum used for the base. In order to avoid break of the sealing material due to thermal stress, the thermal expansion coefficient of the flange is preferably between the ones of the sealing material and the base.

Since the thermal expansion coefficient of the flange is different from the one of the base, large thermal stress is applied to the solder joint section of the flange and the base. On the other hand, the solder used for joining the feedthrough and the base has small material yield strength. For this reason, it is important to secure sufficient solder joint reliability between the feedthrough and the base in response to the thermal stress accompanying changes in temperature environment in use of an HDD. Furthermore, in solder-joining the feedthrough and the base, it is important to consider a problem that the overflowed solder contacts the pins to cause a short, and the like.

BRIEF SUMMARY OF THE INVENTION

Figure 5A:
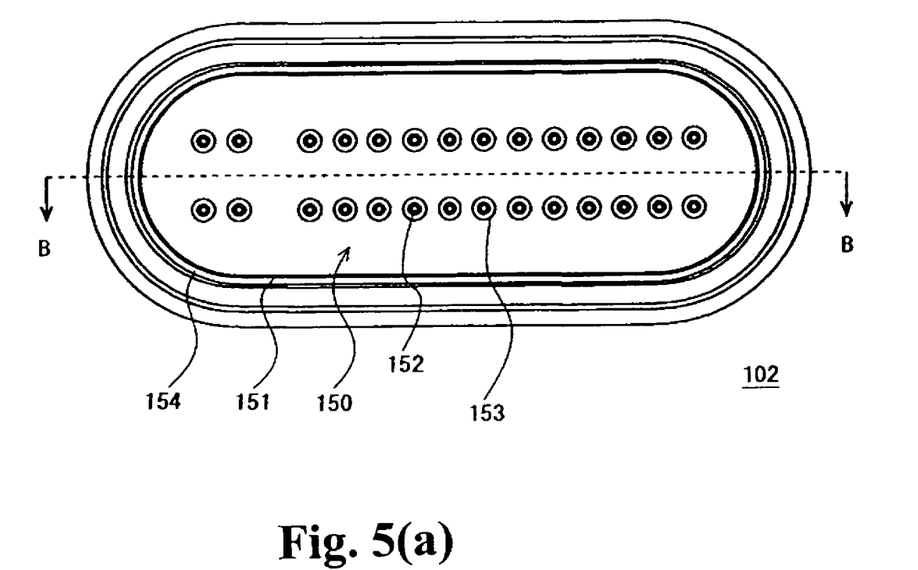
FIGS. 5(a) and 5(b) are views schematically showing the structures of the feedthrough fixed to the base according to one embodiment and its surrounding area.
Figure 5B:
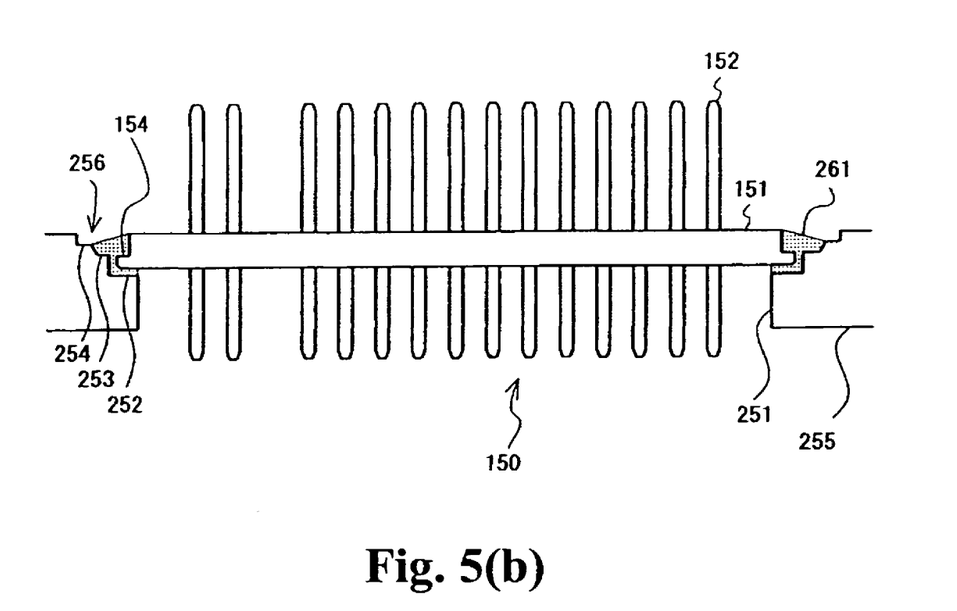

In a disk drive device in which low-density gas is sealed, embodiments in accordance with the present invention improve joint reliability at a solder joint section between a feedthrough and an enclosure with respect to stress applied by deformation due to changes in temperature environment in use. According to the particular embodiment of FIG. 5, helium gas is sealed in an interior space of a HDD 1. A feedthrough 150 is solder-jointed to a feedthrough mounting surface 252 of a base 102. At a part with relatively large thermal stress, a width of the feedthrough mounting surface 252 is increased, and at a part with relatively small thermal stress, a width of the feedthrough mounting surface 252 is decreased. This enables to prevent a crack penetrating path from being generated at the solder joint section 261 due to the thermal stress and to prevent the solder joint section 261 from contacting pins 152.

DETAILED DESCRIPTION OF THE INVENTION

Embodiments of the present invention relate to a disk drive device, more particularly to a hermetically-sealed disk drive device suitable for enclosing low-density gas, such as helium gas, within the device.

A disk drive device according an aspect of embodiments of the present invention comprises a disk, a motor for rotating the disk, a head for accessing the disk, a moving mechanism for supporting and moving the head, a base for housing the disk, the motor, the head and the moving mechanism, a cover joined to the base. Gas with lower density than air is sealed within an interior space which is formed by joining the base and the cover. The disk drive further comprises a feedthrough which is solder jointed to the base to cover an opening penetrating the base to join an outside of the device and the interior space and is connected electrically to a wiring arranged in the interior space. The base has a mounting surface on which the feedthrough is mounted around the opening. The feedthrough includes a flange whose outline is larger than the opening and pins which are fixed to the flange and are electrically connected to the wiring. A rim part of the flange is solder-jointed to the mounting surface. The solder-jointed mounting surface has a first part and a second part whose width is larger than the one of the first part, and thermal stress at the solder joint section of the second part is larger than the one of the first part. The mounting surface at the solder joint section having a width corresponding to the thermal stress improves the solder joint reliability at the solder joint section and prevents the solder from leaking at the solder joint section with respect to the stress applied in response to deformation accompanying changes in temperature environment in use.

The solder joint section at the second part is preferably solder-jointed to respective two points on the flange, and the distance therebetween is the maximum dimension in the flange. This improves the solder joint reliability against the thermal stress much more.

Preferably, the solder thickness of the solder joint section at the second part is larger than a solder thickness of the solder joint section at the first part. This improves the solder joint reliability against the thermal stress much more.

A disk drive device according another aspect of embodiments of the present invention comprises a disk, a motor for rotating the disk, a head for accessing the disk, a moving mechanism for supporting and moving the head, a base for housing the disk, the motor, the head and the moving mechanism, and a cover joined to the base; gas with lower-density than air is sealed within an interior space which is formed by joining the base and the cover; and the disk drive further comprises a feedthrough which is solder jointed to the base to cover an opening penetrating the base to join an outside of the device and the interior space and is connected electrically to a wiring arranged in the interior space. The base has a mounting surface on which the feedthrough is mounted around the opening. The feedthrough includes a flange whose outline is larger than the opening and pins which are fixed to the flange and are electrically connected to the wiring. A rim part of the flange is solder-jointed to the mounting surface. The solder-jointed mounting surface has a first part and a second part, thermal stress at the solder joint section of the second part being larger than the one at the solder joint section of the first part and a solder thickness of the solder joint section of the second part being larger than the one of the solder joint section of the first part. The mounting surface at the solder joint section having a thickness corresponding to the thermal stress improves the solder joint reliability at the solder joint section and prevents the solder from leaking at the solder joint section with respect to the stress applied in response to deformation accompanying changes in temperature environment in use.

Preferably, the mounting surface has depressed parts and projected parts so that the thicknesses of the solder joint sections of the first part and the second part are different. This achieves different solder thicknesses efficiently in manufacturing.

The solder joint section at the second part are preferably solder-jointed to respective two points on the flange, and the distance therebetween is the maximum dimension in the flange. This improves the joint reliability against the thermal stress much more.

The structure of embodiments of the present invention, with respect to the stress caused by deformation of the disk drive device due to temperature changes, improves joint reliability at the solder joint section between the feedthrough and the base.

Hereinafter, certain embodiments of the present invention are described. For clearness of explanation, the following description and the accompanying drawings contain omissions and simplifications as appropriate. Throughout the drawings, like components are denoted by like reference numerals, and their repetitive description is omitted if not necessary for the sake of clearness. In one embodiment, a hard disk drive (HDD) is described as an example of a disk drive device. Low-density gas is sealed in the interior space of the HDD according to the present embodiment. A feature of the present embodiment is a joining method of a feedthrough to a base of the HDD. First, an entire configuration of the HDD according to the present embodiment is outlined.

Figure 1:
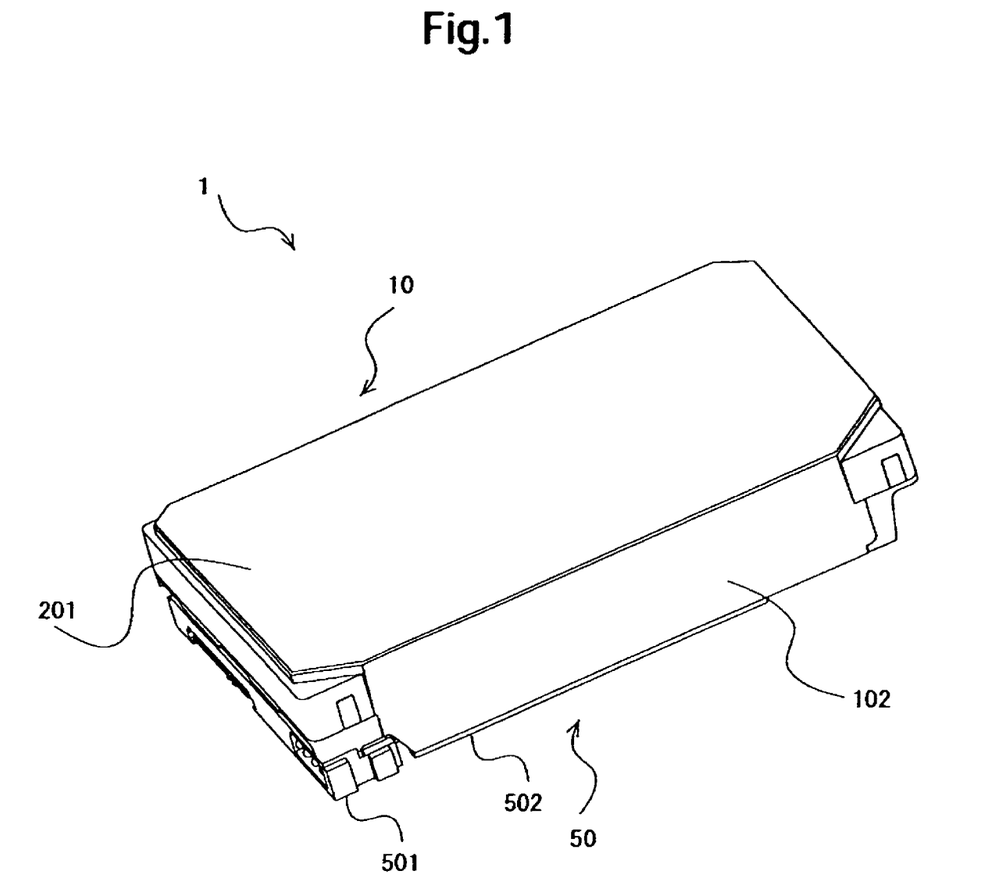
FIG. 1 is a perspective view schematically showing the configuration of the hermetically-sealed HDD according to one embodiment.

FIG. 1 is a perspective view schematically illustrating the configuration of the hermetically-sealed HDD 1 according to the present embodiment. The HDD 1 comprises a head disk assembly (referred to as HDA hereinbelow) 10 and a control circuit board 50 fixed to the outer bottom surface of the HDA 10. The control circuit board 50 has an interface connector 501 to an external host and a circuit board 502 on which the interface connector 501 and various ICs are mounted. The HDA 10 has a base 102 and a top cover 201. The base 102 and the top cover 201 are main parts of an enclosure. Components comprising a part of the HDA 10 are housed in the interior space formed by the base 102 and the top cover 201.

Figure 2:
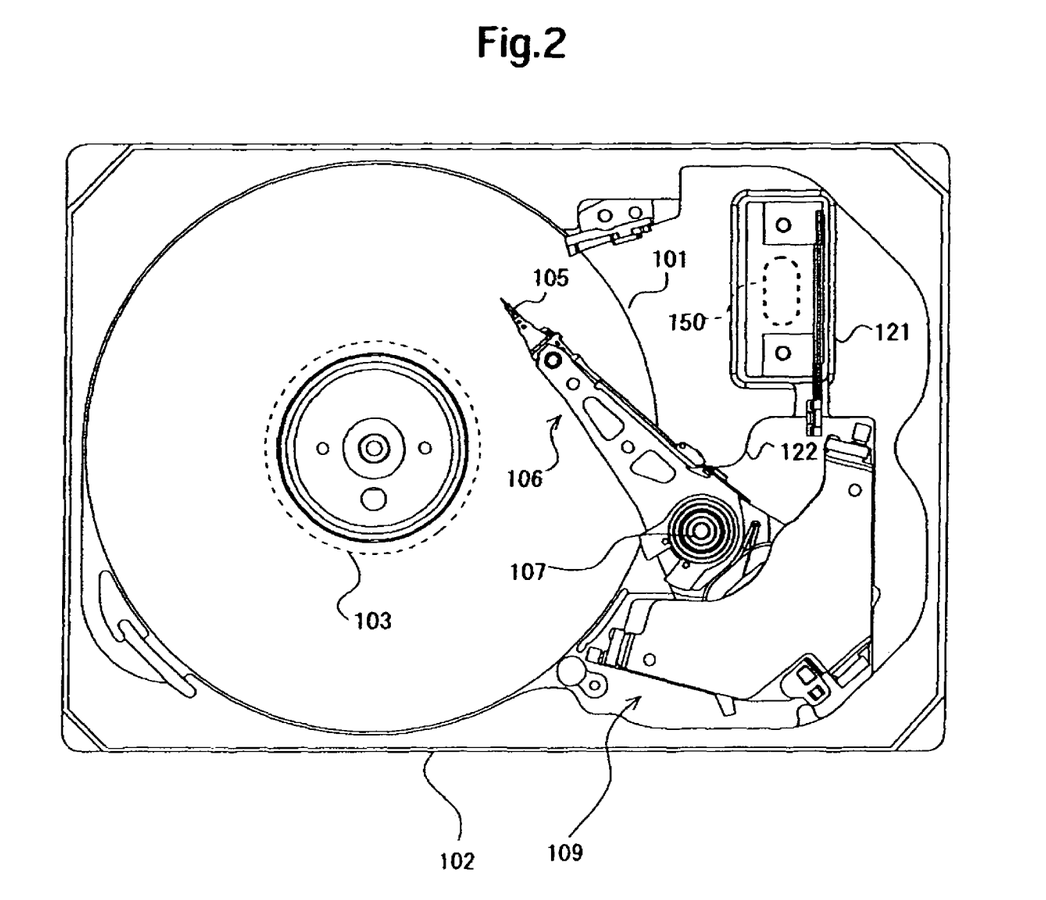
FIG. 2 is a top view schematically showing the structure within the interior space of the HDD according to one embodiment.

Operation of the respective components in the interior space shown in FIG. 2 is performed by the control circuit on the control circuit board 50. FIG. 2 is a top view of the hermetically-sealed HDD 1 with the top cover 201 removed from the enclosure. A head slider 105 as an example of a head reads and writes from and to a magnetic disk 101. An actuator 106 supports and moves the head slider 105. The actuator 106 is supported pivotally about a pivotal axis 107 and is driven by a voice coil motor (referred to as VCM hereinbelow) 109.

The assembly of the actuator 106 and the VCM 109 is a moving mechanism of the head slider 105. The magnetic disk 101 is supported by a spindle motor (referred to as SPM hereinbelow) 103 fixed to the base 102 and is rotated by the SPM 103 at a predetermined angular rate. In order to read and write data from and to the magnetic disk 101, the actuator 106 moves the head slider 105 above the data region on the surface of the rotating magnetic disk 101.

Signals between the control circuit on the control circuit board 50 and the VCM 109, between the control circuit and the SPM 103, and between the control circuit and the head slider are transmitted through a flexible printed circuit (FPC) 122 and an FPC connector 121, which are signal transmission wirings within the base 102. The FPC connector 121 is coupled to the feedthrough 150, which is fixed to the bottom surface of the base 102 and connects the FPC connector 121 and the control circuit board 50 via circuitry (electrically) and physically.

Returning to FIG. 1, the enclosure of the HDA 10 of the present embodiment has a base 102 for housing the above-described components and a top cover 201 for covering a top opening of the base 102. In the HDD 1 of the present embodiment, low-density gas which has lower density than air is sealed. Although hydrogen or helium is considered as the low-density gas, helium is optimum because it is much effective, stable, and safe. Hereinbelow, a case using helium is described by way of example.

In manufacturing steps of the HDD 1, the base 102 is first manufactured by die-casting or cutting and then an opening is made on the bottom of the base 102. Secondly, a feedthrough 150 is soldered to infill the opening. Next, a head stack assembly (HSA) which is an assembly of the actuator 106 and the head slider 105, the SPM 103, the magnetic disk 101, and so on are mounted within the base 102 which has been joined with the feedthrough 150, and then the top cover 201 is fixed to the base 102 in a helium gas atmosphere. Typically, the top cover 201 is fixed to the base 101 by means of laser-welding or solder joint. Thereby, helium gas is sealed in the interior space 213 constituted by the top cover 201 and the base 102. Finally, the control circuit board 50 is mounted to the HDA 10 to finish the HDD 1.

In this connection, when the laser-welding or solder joint is used for fixing the top cover 201, the materials of the base 102 and the top cover 201 should be selected in view of their durability, reliability, and cost. For example, either set of the base 102 formed by aluminum die-casting and the aluminum top cover 201 formed by pressing or cutting, or the base 102 formed by cold forging from an aluminum alloy whose contents of copper and magnesium are relatively small and the aluminum top cover 201 formed by pressing or cutting is preferably selected.

Figure 3:
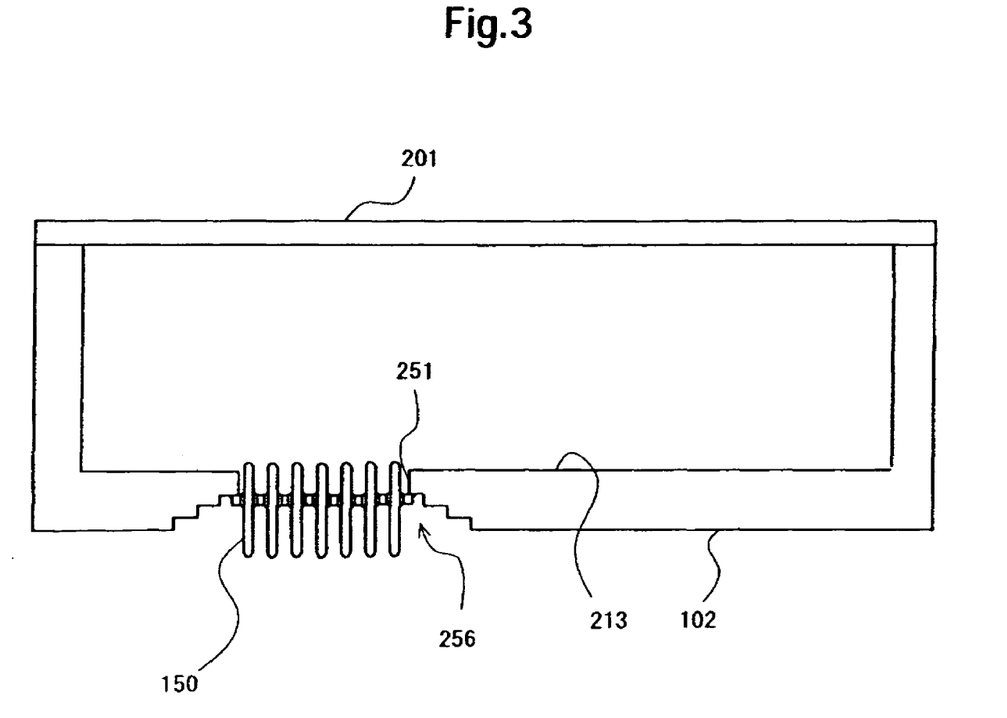
FIG. 3 is a cross-sectional view schematically showing the feedthrough joined to the base, the top cover, and the bottom surface of the base according to one embodiment.
Figure 4:
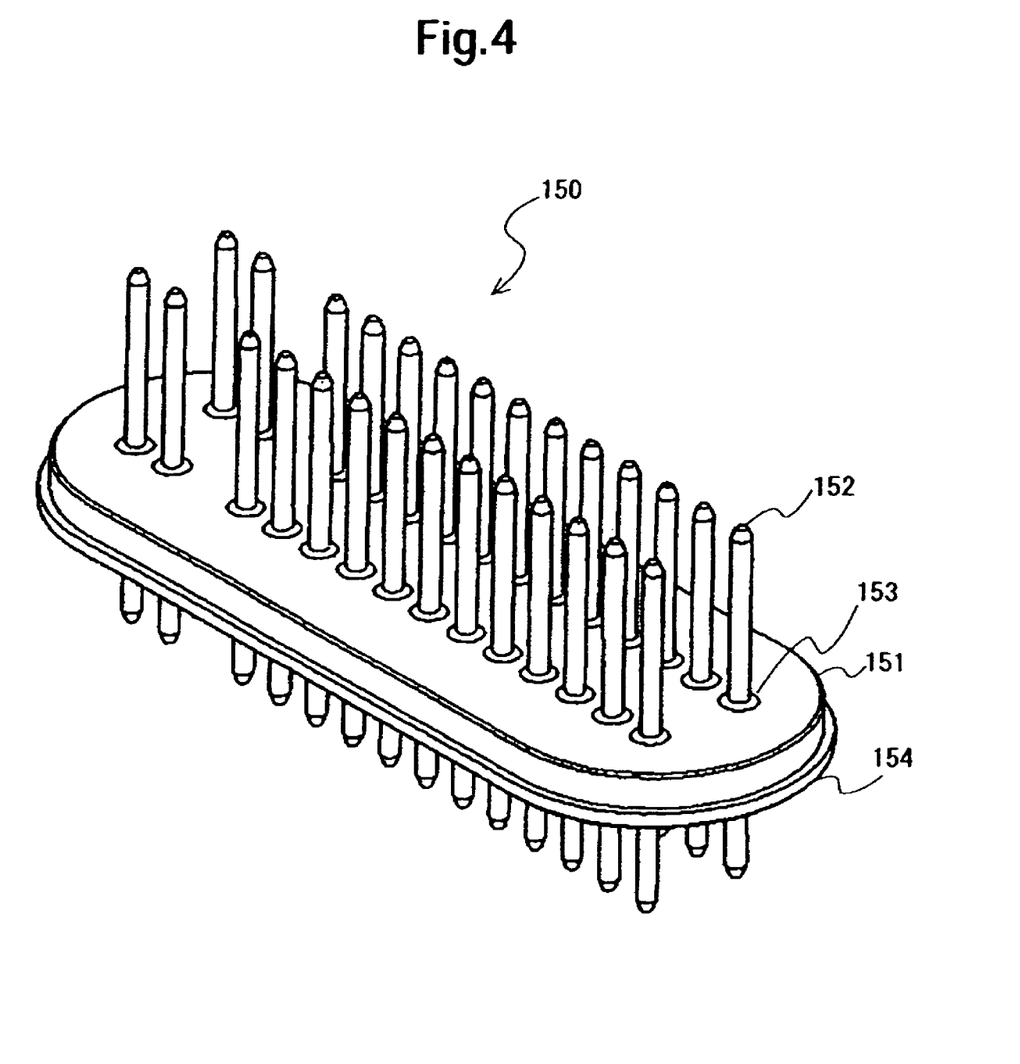
FIG. 4 is a perspective view schematically showing the structure of the feedthrough according to one embodiment, the surface to be exposed to the outside of the HDD facing up.

Hereinbelow, the structure of the joint section of the feedthrough 150 and the base 102 is described in detail. FIG. 3 is a cross-sectional view schematically showing the base 102, the top cover 201, and the feedthrough 150 joined to the bottom surface of the base 102. As shown in FIG. 2, the feedthrough 150 is set near the FPC connector 121 on the bottom surface of the base. In FIG. 3, each component within the interior space 213 is omitted. FIG. 4 is a perspective view schematically showing the structure of the feedthrough 150, whose surface to be exposed to the outside of the HDD 1 is shown upward.

As shown in FIG. 3, the base 102 has an opening 251 which is a penetrated hole on its bottom and the feedthrough 150 is placed so as to infill the opening 251. Also, the feedthrough 150 is placed in a depressed part 256 formed on the outer bottom surface of the base 102. As shown in FIG. 4, the feedthrough 150 has a flange 151 and a plurality of pins 152 which penetrate the flange 151 and are supported vertically by the flange 151. Sealing materials 153 of glass, ceramic, or the like are filled around the pins 152 and hermetically-seal between the pins 152 and the flange 151. The pins 152 are connected electrically and physically to the FPC connector 121 inside the interior space and are connected electrically and physically to the control circuit board 50 outside the base 102.

The hermetically-sealed HDD requires retaining of the enclosed low-density gas of helium so that high air-sealing performance is required for the joint between the feedthrough 150 and the base 102. Therefore, sealing between the feedthrough 150 and the base 102 is made by soldering. FIG. 5(*a*) is a plan view schematically illustrating the structure of the feedthrough 150 and therearound, showing the state that the bottom surface of the base 102 are viewed from the outside of the HDD 1. FIG. 5(*b*) is a cross-sectional view along the B-B line of FIG. 5(*a*). In FIG. 5(*b*), the lower part thereof is the interior space of the HDD 1.

As shown in FIG. 5(*a*), the feedthrough 150 has the pins 152 aligned in double rows. The direction in which the each row extends is a longitudinal direction and the direction which is the vertical direction to the longitudinal direction and in which each row is placed side by side is the shorter side direction. The outline of the feedthrough 150, i.e., the outline of the flange 151, is an oval shape and has two sides in parallel lines extending toward the longitudinal direction and two half-circled sides which connect the respective side ends. For example, the outer dimension of the longitudinal direction of the flange 151 is about 25 mm, and the one of the short side direction is about 10 mm.

As shown in FIG. 5(*b*), the opening 251 penetrating the base 102 is provided on the bottom surface of the base 102 and a mounting surface 252 for the feedthrough 150 is provided around the opening 251 on the outer side of the device. The feedthrough 150 is attached to the base 102 from the outside of the base so as to seal the opening 251 of the base 102. The outline of the flange 151 of the feedthrough 150 is larger than the opening 251 and its rim and the base 102 are soldered and joined at the solder joint section 261.

Specifically, as shown in FIG. 5(*b*), the mounting surface 252 is one of a plurality of tiers which are formed toward the outer side of the base as viewed from the opening 251. Specifically, the depressed part 256 around the opening 251 is formed on the outer bottom surface 255 of the base 102 and three tiers 252 to 254 which are different in level are formed in the depressed part 256. The respective tiers 252 to 254 are formed to surround the rim of the opening 251. The tier 252 which is the closest to the opening 251 and determines the outer edge of the opening 251 is the feedthrough mounting surface 252.

The outline of the flange 151 of the feedthrough 150 is larger than the opening 251. The rim of the flange 151 is placed on the feedthrough mounting surface 252 from the outside of the base 102 and is solder jointed to the depressed part 256 of the base 102 to form the solder joint section 261. The solder joint section 261 is formed between the bottom surface of the flange 151 and the feedthrough mounting surface 252 as well as between the side surface of the flange 151 and the inner surface of the depressed part 256.

The material of the flange 151 is selected so as to suit the sealing material 153 of glass or the like and the material of the base 102 and to reduce the stress on the sealing material 153 and the solder joint section 261. If the base 102 is made of aluminum, the flange is preferably made of steel or stainless steel. This is because the thermal expansion coefficients thereof are between the thermal expansion coefficients of aluminum and of glass. Specifically, the thermal expansion coefficient of the sealing material 153 of glass or the like is approximately 10 ppm/° C. at maximum, the one of steel is approximately 13 to 17 ppm/° C., and the one of aluminum die-casting material is substantially 20 ppm/° C.

Here, the material yield strength of solder is lower than the ones of common metals such as steel, aluminum, and the like. As described above, since there is a difference in the thermal expansion coefficients between the materials of the flange 151 of the feedthrough 150 and of the base 102, stress is added to the solder joint section 261 which has a lower yield strength in accordance with the deformation due to changes of the temperature environment in use of the HDD 1. The stress generates a crack at the solder joint section 261 and a penetrating path in the solder joint section 261 so that a sufficient sealing performance may not be secured.

Figure 6A:
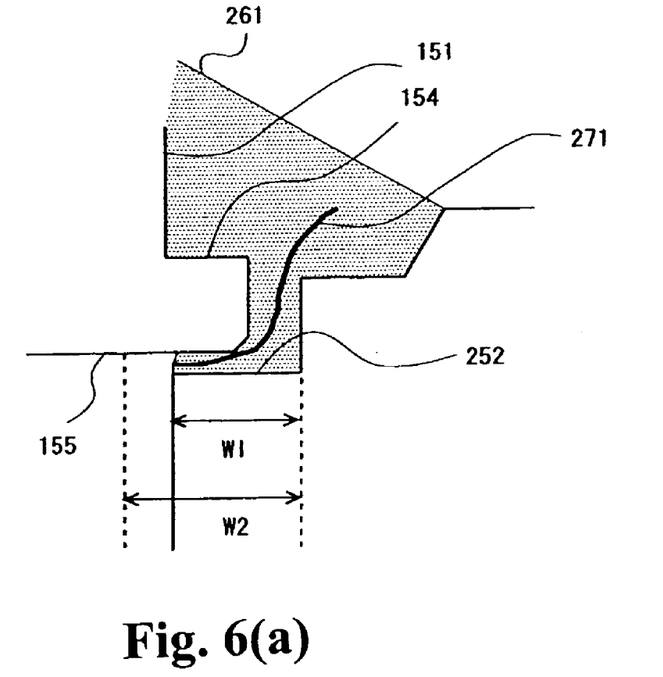
FIGS. 6(a) and 6(b) are enlarged cross-sectional views schematically showing the structures of the solder joint section according to one embodiment.
Figure 6B:
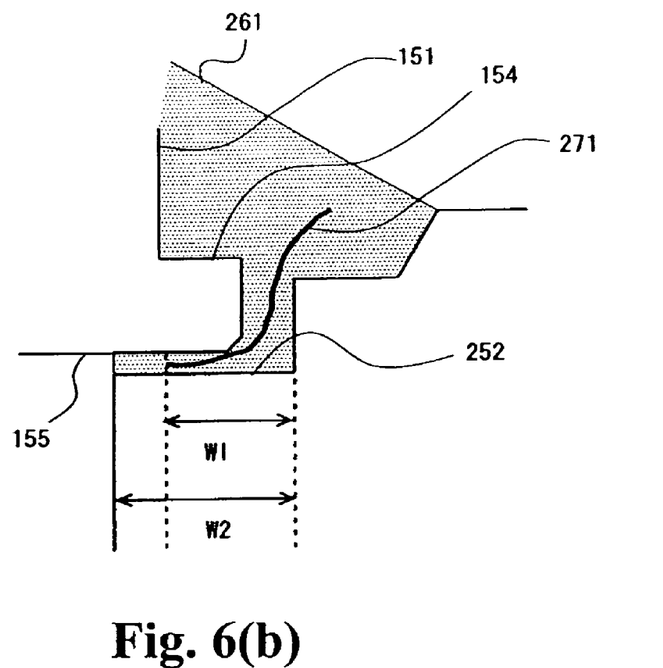

One way to suppress deterioration of the sealing performance at the solder joint section 261 due to the foregoing stress is to increase the width of the feedthrough 150. FIGS. 6(a) and 6(b) are enlarged cross-sectional views schematically showing the structure of the solder joint section 261. In FIG. 6(a), the feedthrough mounting surface 252 has a width of W1. In FIG. 6(b), the feedthrough mounting surface 252 has a width of W2. The width W2 is larger than the width W1. For example, W1 is approximately 0.5 mm and W2 is approximately 1.0 mm. Here, the width of the feedthrough mounting surface 252 can be defined as the distance along the normal line direction of the opening side edge of the feedthrough mounting surface 252.

A crack 271 in the solder joint section 261 extends into the section between the feedthrough mounting surface 252 and the flange 151. Therefore, increasing the width of the feedthrough mounting surface 252 results in extending the extension length and the extension time of the crack 271, which can reduce the possibility that the crack grows in the solder joint section 261 to the end of the solder joint section 261 to form a penetrating path in the solder joint section 261. Further, increasing the width of the feedthrough mounting surface 252 can improve the strength of the solder joint section 261 and the yield strength against the thermal stress.

As described above, in order to improve the reliability of the solder joint section 261 against the thermal stress, it is preferable to increase the width of the feedthrough mounting surface 252 as large as possible. However, unnecessarily increasing the width of the feedthrough mounting surface 252 will cause other problems. With respect to the solder joint between the feedthrough 150 and the base 102, the solder is not retained in the depressed part 256 of the base 102 but overflows into the interior-space-side surface 155 of the flange 151. In solder jointing, the outer bottom surface of the base 102 is placed to face upward; the feedthrough 150 is placed on the feedthrough mounting surface 252; a ring-shaped solder preform is placed in the depressed part 256; and the solder is melted in an oven. On this occasion, the liquid solder material flows out over the interior-space-side surface 155 of the flange 151.

Increasing the width of the feedthrough mounting surface 252 results in narrowing the spaces between the opening side edge of the feedthrough mounting surface 252 and the pins 152 so that the overflowed solder may contact the pins 152 to cause a short. Therefore, it cannot be considered that it is preferred to increase the width along the entire circumference of the feedthrough mounting surface 252.

The magnitude of the thermal stress applied to the solder joint section 261 is different in places. As apparent, the crack 271 is likely to be generated at a part where the thermal stress is large and is less likely to be generated at a part where the thermal stress is smaller. Therefore, increasing the width of the feedthrough mounting surface 252 at the part where the thermal stress is relatively large and narrowing the width of the feedthrough mounting surface 252 at the part where the thermal stress is small enable to prevent the solder joint section 261 from contacting pins 152 in addition to preventing a penetrating path from being generated at the solder joint section 261 due to the thermal stress.

The crack 271 is likely to be generated especially at the part where the thermal stress is largest. Therefore, it is preferred to increase the width of the feedthrough mounting surface 252 in the region which includes this part. Especially, setting the width of the part where the thermal stress becomes the maximum to be largest enables to prevent a penetrating path from being generated more effectively. Also, setting the width of the feedthrough mounting surface 252 at the part where the thermal stress becomes smallest to be smaller enables to prevent defects from arising due to the solder overflowed. Specifically, narrowing the width results in acquiring more distances to the pins to enable to make a space to pool the overflowed solder.

Figure 7A:
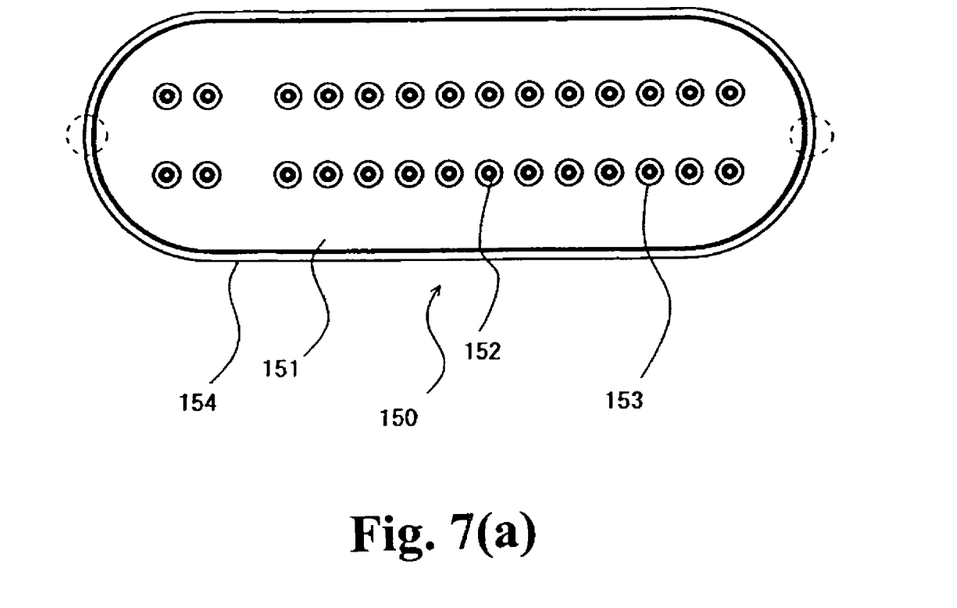
FIGS. 7(a) and 7(b) are views schematically showing the feedthrough according to one embodiment and the depressed part in which the feedthrough is embedded.
Figure 7B:
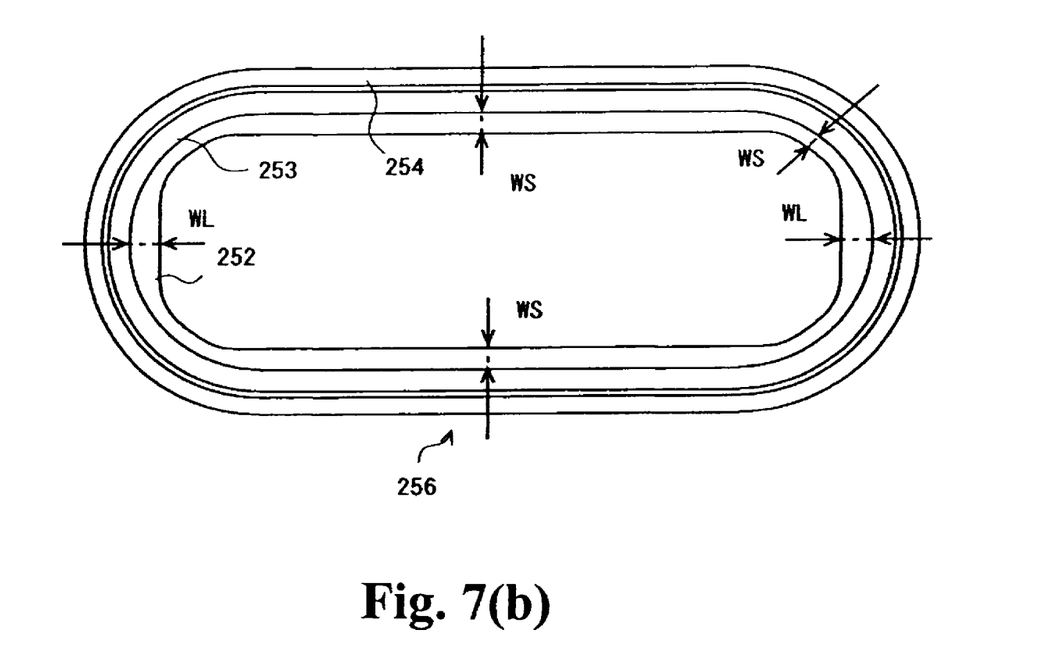

FIG. 7(a) is a plan view schematically showing the shape of the feedthrough 150 and FIG. 7(b) is a plan view schematically showing the shape of the depressed part 256 of the base 102 in which the feedthrough 150 is embedded. FIGS. 7(a) and 7(b) show the respective shapes viewed from the outside of the base 102. i.e., the control circuit board 50 side. In the oval-shaped feedthrough 150 like the present example, the thermal stress at the both ends (denoted by dotted circles in FIG. 7(a)) in the longitudinal direction (the right and left direction in FIG. 7(a)) is the largest. These two points correspond to each other with respect to the center point of symmetry of the oval. Also, the distance between the two points is the longest distance between any two points of the outline of the flange 151 of the feedthrough 150.

Therefore, as shown in FIG. 7(b), the widths WL of the parts on the feedthrough mounting surface 252 which correspond to the both ends in the longitudinal direction of the feedthrough 150 should be larger than the ones of the other parts. In the example of FIG. 7(b), the feedthrough mounting surface 252 has the largest widths WL. The widths decrease to the smallest widths WS as departing from the points with the width WL. For example, in FIG. 7(b), at the points corresponding to each of the both ends in the shorter side direction (the up and down direction in FIG. 7 (b)), the widths of the feedthrough mounting surface 252 are denoted by WS.

Thus, relatively increasing the width of the feedthrough mounting surface 252 in the region where the thermal stress is relatively large can prevent a crack from being generated due to the thermal stress and prevents defects from occurring due to the overflowed of solder. As a result of an experiment on duration with changing the width of the feedthrough mounting surface 252, a significant improvement has been found, comparing to the case where all the widths of the feedthrough mounting surface 252 are small as WS.

Next, another way to reduce occurrences of sealing defects at the solder joint section 261 will be described. In the above-described embodiment, increasing the width of the feedthrough mounting surface 252 reduces occurrences of sealing defects at the solder joint section. Moreover, increasing the thickness of the solder joint section 261 can reduce occurrences of cracks. Thickening the solder joint section 261 decreases shearing stress to reduce occurrences of cracks.

Figure 8A:
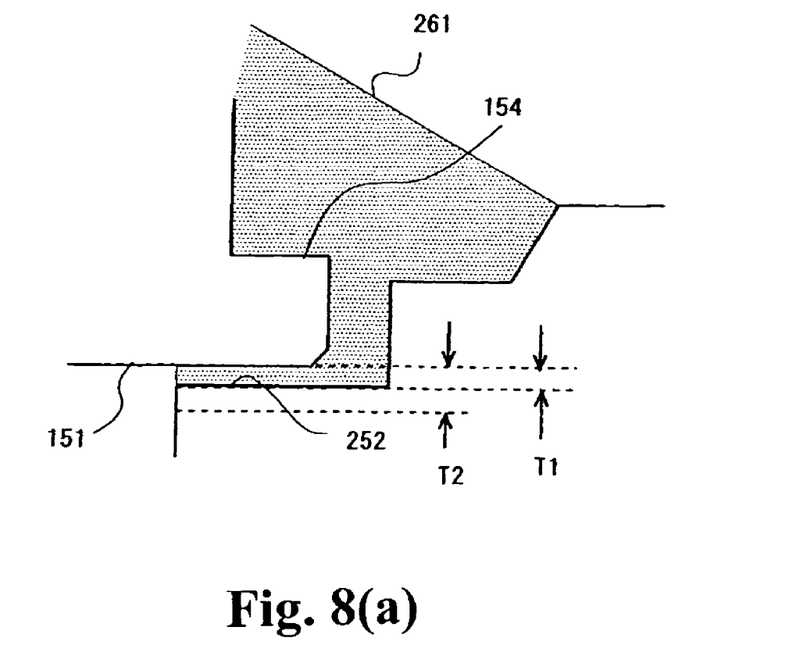
FIGS. 8(a) and 8(b) are cross-sectional views schematically showing the solder joint sections having different solder thicknesses according to one embodiment.
Figure 8B:
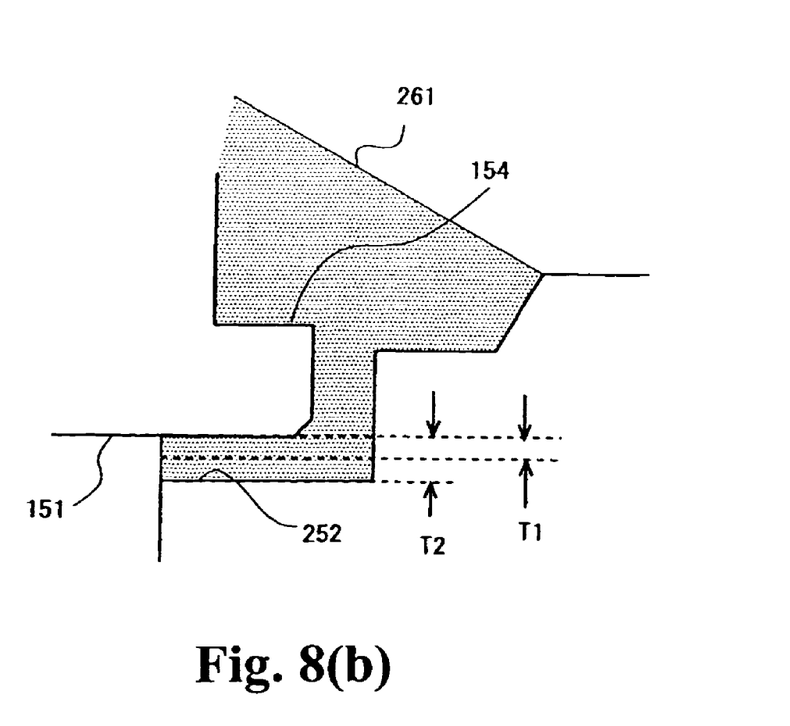

FIGS. 8(a) and 8(b) are cross-sectional views schematically showing the solder joint sections 261 where solder thicknesses are different. The solder joint section 261 of FIG. 8(a) has a solder thickness of T1 and the solder joint section 261 of FIG. 8(b) has a solder thickness of T2. The solder thickness T2 is larger than the solder thickness T1 and the strength in the solder joint section 261 of FIG. 8(b) is relatively large and the shearing stress is relatively small. Here, the solder thickness is defined as the distance between the feedthrough mounting surface 252 and the bottom surface of the flange 151.

From the point of view in reducing the shearing stress, the solder thickness of the entire parts in the solder joint section 261 is preferable to be large. However, thickening the solder increases the probability of solder overflow at the time of the solder joint. Thickening the solder increases the amount of solder so that more solder is likely to be leaked to contact pins 152, which may cause a short. Therefore, it is not considered that increasing the solder thickness along with the entire outline of the feedthrough mounting surface 252 is preferable. Then, relatively thickening a part of the solder is preferable instead of thickening the solder across the entire part of the solder joint section 261.

As described above, the magnitude of the thermal stress applied to the solder joint section 261 is different in place. The crack 271 is likely to be generated at the part where the thermal stress is larger and is less likely to be generated at the part where the thermal stress is smaller. Accordingly, thickening the solder at the part where the thermal stress is relatively large and thinning the solder at the part where thermal stress is smaller enable to prevent the solder joint section 261 from contacting the pins 152 as well as a penetrating path from being generated.

Figure 9A:
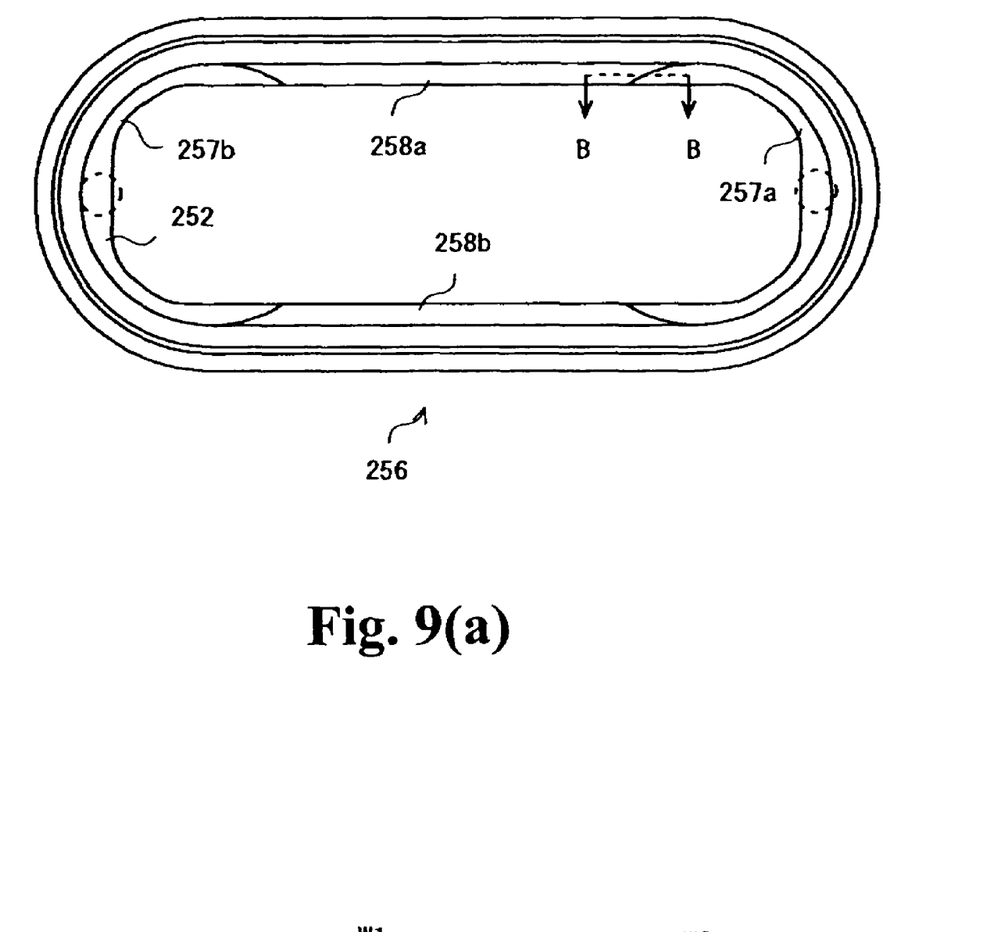
FIGS. 9(a) and 9(b) are views schematically showing the shape of the depressed part in which the feedthrough according to one embodiment is embedded and the soldered part at the solder joint section.
Figure 9B:
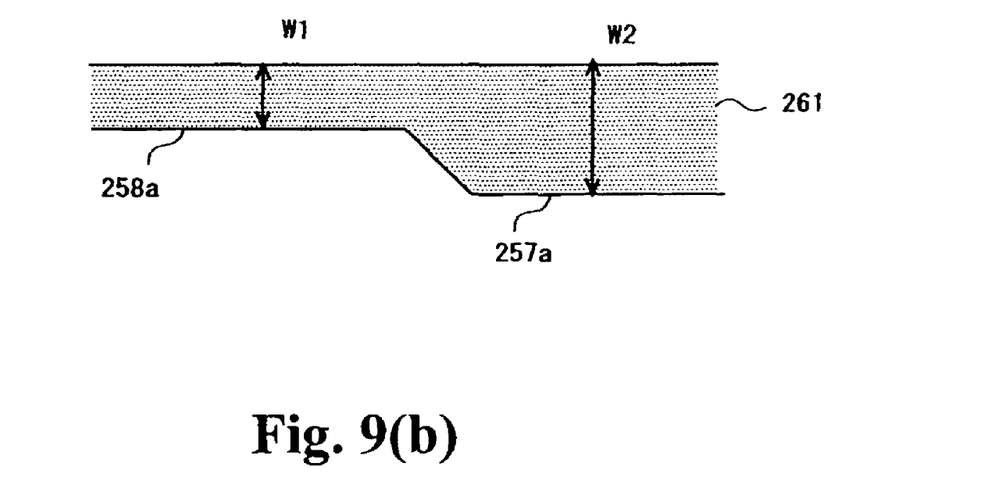

Some ways for relatively increasing the solder thickness in a part of the solder joint section 261 more than the remaining part can be considered and a preferred example among them is illustrated in FIGS. 9(a) and 9(b). FIG. 9(a) is a plan view schematically showing the shape of the depressed part 256 on the base 102 in which the feedthrough 150 is embedded. FIG. 9(b) is a cross-sectional view along the B-B line of the FIG. 9(a), schematically showing the soldered part in a case that the solder joint section 261 is formed on the feedthrough mounting surface 252. FIG. 9(a) shows the shape of the depressed part, as viewed from the outside of the base, i.e., from the control circuit board 50 side. As described above, in an oval-shaped feedthrough 150, the thermal stress at the both ends (denoted by dotted circles in FIG. 9(a)) in the longitudinal direction (the right and left direction in FIG. 9(a)) is the largest.

In example of FIG. 9(a), the regions 257a and 257b including the ends in the longitudinal direction on the feedthrough mounting surface 252 (regions surrounded by the dotted circles) are cut so that the level of those regions becomes lower than the one of the regions 258a and 258b which include the centers of the two straight lines. At the step of solder jointing on the feedthrough 160, molten solder flows in between the flange 151 and the feedthrough mounting surface 252 in a state that the feedthrough 150 is placed on the regions 258a and 258b. The molten solder also flows in between the region 258a and the flange 151, and the region 258a and 258b is thicker than the solder thickness W1 at the regions 258a and 258b by the level difference between the regions 258a and 258b and the regions 257a and 257b. The solder thickness W1 is, for example, approximately 50 μm. The solder thickness W2 is preferably more than 100 μm.

As described above, relatively increasing the solder thickness at the part where the thermal stress at the solder joint section 261 is relatively large improves the sealing reliability at the solder joint section 261 and can inhibit contacts to the pins 152. As a result of an experiment on duration with actually changing the solder thickness of the solder joint section 261, as shown in FIG. 9, a significant improvement has been observed, as compared to the case where the entire solder thickness is as thin as T1.

In the example of FIG. 9, the solder thickness is relatively increased in the longitudinal ends in addition to the width of the feedthrough mounting surface 252. In order to solve the problem in the above-described solder joint section 261, it is preferable that both of these ways are adopted, but either one may be adopted.

Providing depressed parts and projected parts on the flange 151 of the feedthrough 150 can vary the solder thickness at the solder joint section 261. However, from the view point of process simplicity i.e., the manufacturing effectiveness, providing depressed parts and projected parts on the feedthrough mounting surface 252 is preferable to vary the solder thickness at the solder joint section 261. Further, on the feedthrough mounting surface 252, limiting the number of the different levels (tiers) of depressed parts and projected parts to two, as shown in FIG. 9(a) instead of forming many tiers with different levels can improve reliability at the solder joint section 261 as well as process effectiveness.

The foregoing feedthrough 150 has an oval-shaped outline but embodiments of the present invention can be applied to HDDs with feedthroughs in different shapes. As the shape of the feedthrough, and ellipse shape and a rectangular shape with four curved corners can be considered. In these shapes, the structure of the solder joint section can be designed in view of both of cracks and solder leakage with respect to the part where the thermal stress is large, especially the part where the thermal stress is the largest, as described above. In case of symmetrical shapes like these, the thermal stress at the two end points of the outlines between which the distances are the longest is typically the largest.

As set forth above, the present invention is described by way of the preferred embodiments, but it is not limited to the above-described embodiments. A person skilled in the art can easily modify and add the each element in the above embodiments within the scope of the present invention. For example, embodiments of the present invention are useful especially to HDDs but may be applied to other types of disk drive devices. Further, in view of proof strength at the solder joint section and contamination to the interior space due to solder joint, it is preferable that the feedthrough is placed outside of the base to be solder-jointed but it may be placed inside of the base to be solder-jointed according to the design. Also, the feedthrough can be configured to transfer a signal of the head slider and/or a signal of the VCM.

What is claimed is:

1. A disk drive device comprising:
    a disk;
    a motor for rotating the disk;
    a head for accessing the disk;
    a moving mechanism for supporting and moving the head;
    a base for housing the disk, the motor, the head and the moving mechanism;
    a cover joined to the base; and
    gas which has lower density than air sealed within an interior space which is formed by joining the base and the cover; wherein:
    the disk drive further comprises a feedthrough which is solder-jointed to the base to cover an opening penetrating the base to join an outside of the device and the interior space and is connected electrically to a wiring arranged in the interior space;
    the base has a mounting surface on which the feedthrough is mounted around the opening;
    the feedthrough includes a flange whose outline is larger than the opening and pins which are fixed to the flange and are electrically connected to the wiring;

a rim part of the flange is solder-jointed to the mounting surface; and the solder-jointed mounting surface has a first part and a second part whose width is larger than the one of the first part, and thermal stress at the solder joint section of the second part is larger than the one of the first part.

2. The disk drive device according to claim 1, wherein the solder joint section at the second part are solder-jointed to respective two points on the flange, and the distance therebetween is the maximum dimension in the flange.

3. The disk drive device according to claim 1, wherein a solder thickness of the solder joint section at the second part is larger than a solder thickness of the solder joint section at the first part.

4. A disk drive device comprising:
a disk;
a motor for rotating the disk;
a head for accessing the disk;
a moving mechanism for supporting and moving the head;
a base for housing the disk, the motor, the head and the moving mechanism;
a cover joined to the base; and
gas which has lower density than air sealed within an interior space which is formed by joining the base and the cover; wherein
the disk drive further comprises a feedthrough which is solder jointed to the base to cover an opening penetrating the base to join an outside of the device and the interior space and is connected via circuitry to a wiring arranged in the interior space;

the base has a mounting surface on which the feedthrough is mounted around the opening;

the feedthrough includes a flange whose outline is larger than the opening and pins which are fixed to the flange and are connected to the wiring;

a rim part of the flange is solder-jointed to the mounting surface; and the solder-jointed mounting surface has a first part and a second part, thermal stress at the solder joint section of the second part being larger than the one at the solder joint section of the first part and a solder thickness of the solder joint section of the second part being larger than the one of the solder joint section of the first part.

5. The disk drive device according to claim 4, wherein the mounting surface has depressed parts and projected parts so that the thicknesses of the solder joint sections of the first part and the second part are different.

6. The disk drive device according to claim 4, wherein the solder joint section at the second part are solder-jointed to respective two points on the flange, and the distance therebetween is the maximum dimension in the flange.

* * * * *